2,736,757
PROCESS OF PRODUCING SOLUBLE CHLORINATED RUBBER

Hendrik Albert Wildrik Nijveld, Delft, Netherlands, assignor to Rubber-Stichting, Delft, Netherlands No Drawing. Application November 10, 1952,
Serial No. 319,799

Claims priority, application Netherlands
November 17, 1951

7 Claims. (Cl. 260—735)

This invention relates to the preparation of chlorinated rubber which is soluble in the conventional solvents such as for instance aromatic hydrocarbons, chlorinated hydrocarbons, esters and ketones.

The invention comprises also the preparation of dispersions of soluble chlorinated rubber, the manufacture of articles consisting partly or entirely of chlorinated rubber and the articles themselves.

Chlorinated rubber was hitherto prepared by dissolving stabilized rubber of relatively low molecular weight in an organic solvent, preferably in carbon tetrachloride, and chlorinating this solution. The solvent here used is expensive.

According to another method disclosed in Patent 2,586,124 chlorinated rubber was prepared by introducing chlorine gas into latex. The method starts from rubber of high molecular weight. The chlorinated product obtained is, as a rule, not soluble in the conventional solvents.

It is an object of this invention to improve this latter process and to obtain a soluble chlorinated product.

This is attained by carrying out the chlorination of the latex in two well defined stages.

In the first stage I introduce chlorine gas into a latex stabilized against acid and acidified to at least 2 gr./equivalents of acid per one water phase at a temperature ranging between about 0° and 50° C., until the chlorinated rubber formed at this stage contains at least 50 and up to 61 per cent of chlorinated rubber.

In the second stage chlorination is continued at a temperature ranging between 0° and 90° C., until a chlorine content of 63–68% has been reached. Apparently the introduction of chlorine in the second stage constitutes, besides a further chlorination, also a breakdown of the chlorinated rubber formed in the first stage.

The chlorine content of the rubber formed by chlorination is determined, at the end of the first stage as well as at the end of the second stage, by separating from a small portion of the dispersion the chlorinated rubber and determining therein the chlorine content by any well-known method.

The soluble chlorinated rubber may then be separated.

Since during chlorination the viscosity of the solution increases, more especially at higher concentration, it is necessary to start the second chlorination step with a chlorinated rubber dispersion having no higher content of dry solids than 30%. Preferably a chlorinated rubber dispersion with a content of dry solids of 10% is used.

The process can be started with ordinary latex or with deproteinized latex, which has to be stabilized against the action of acid by the addition of non-ionogen stabilizers of the polyoxyethylene type, such as polyoxyethyleneglycolalkylarylether or products of condensation of ethylene oxide with oleylalcohol sold under the trade names of Triton X 100, Emulphor O, and Vulcastab LW. The stabilized latex, which may also be diluted or concentrated and may contain from 7 up to 60% of dry rubber, is chlorinated after having been acidified. The acidification is effected preferably with hydrochloric acid. An acidity of at least 2 gr./equivalents of acid per one liter water phase should be reached. If the acidity is too low, a too high oxidation of the rubber takes place. If the latex is diluted with concentrated latex, flocculation will occur.

During the first chlorination step, chlorination can be carried out at temperatures ranging from 0° to 40° C. and with very diluted latex even at 50° C. As a rule, however, a temperature of 20° C. will be preferable.

The more diluted the latex, the higher may be the temperature at which chlorination in the first stage can take place.

Chlorination is continued until a chlorine content of at least 50% and up to 61% is reached. Preferably the chlorination should be gone through at great speed because otherwise the stabilizer may become inoperative before the desired degree of chlorination content has been reached.

At the end of the first chlorination stage, the chlorinated rubber is present in a dispersed form. This chlorinated rubber can be isolated by salting out, heating or by other flocculation methods. The chlorinated rubber thus obtained is insoluble in the usual solvents.

As a starting product for the second chlorination stage the chlorinated rubber dispersion obtained in the first chlorination stage can be used.

Alternatively the chlorinated rubber may be precipitated from that dispersion and then dispersed again in water. In this operation an emulsifying agent may be added and the dispersion thus obtained may be chlorinated.

The chlorination may occur in an acid medium, in which the acidity may at the beginning vary from 0 to 8 normal, that is to say from 0 to 8 gr./equivalents of acid per one liter water phase. Alternatively chlorination may occur in an alkaline medium and at the beginning of the operation the alkalinity may vary from 0 to 6 normal. In this case the medium at the end of the chlorination may become acid up to 0.1 normal.

In the production of a soluble chlorinated rubber with a chlorine content of more than 63% chlorine, chlorination in the second stage in an acid medium should be effected at a temperature between 60° and 90° C.

When starting chlorination in the second stage in an alkaline medium, the temperature should be within the range of 0° and 90° C.

Apart from this limit, the temperature of reaction is not important, neither for obtaining solubility of the product nor for obtaining a high chlorine content.

It is not necessary that the soluble chlorinated rubber be recovered as a solid product. The chlorinated rubber dispersion can be used also directly and in that case it is recommendable to add auxiliary materials such as plasticizers, stabilizers or fillers also in the form of a dispersion. The use of soluble chlorinated rubber, dispersed in water, offers the advantage that the product can be worked further directly without being dissolved or emulsified.

The chlorinated rubber may be precipitated from its dispersions, for instance with the aid of organic solvents, such as methyl alcohol or ethyl alcohol, or an alkali or by passing steam through the dispersion.

In the examples described farther below, Examples I, II, III and IV describe the carrying out of the first chlorination stage.

In Example I normal latex is used as a starting product, in Example II diluted latex is started from, in Example III less acid is added and in Example IV chlorination occurs at a higher temperature.

Example I

Into 200 gr. latex of a concentration of 60% which has been stabilized with 2% Emulphor-O (a product of condensation of ethylene with oleylalcohol) and acidified with 140 cubic cms. HCl ($d=1.19$), chlorine is introduced during 7 hours at 20° C. (at the rate of 20 liters per hour). The chlorinated rubber obtained after separation from the dispension contained 54.3% Cl and was insoluble in the usual solvents.

Example II

Into 200 gr. latex of a concentration of 15% which has been stabilized with 2% Emulphor-O and acidified with 140 cub. cms. HCl ($d=1.19$) chlorine is introduced during 7 hours at 20° C. (at the rate of 20 liters per hour). The chlorinated rubber obtained after separation from the dispersion contained 54.5% Cl and was insoluble in the usual solvents.

Example III

In 200 gr. latex of a concentration of 60% which has been stabilized with 2% Emulphor-O and acidified with 50 cub. cms. HCl ($d=1.19$) and diluted with 90 cub. cms. water, chlorine was introduced during 7 hours at 20° C. (at the rate of 20 liters per hour). The chlorinated rubber obtained after separation from the dispersion contained 52.7% Cl and was insoluble in the usual sovents.

Example IV

Into 200 gr. latex of a concentration of 7% which has been stabilized with 2% Emulphor-O and acidified with 140 cub. cms. HCl ($d=1.19$) chlorine was introduced during 6¼ hours at 50° C. (at the rate of 20 liters per hour). The chlorinated rubber here obtained after separation from the dispersion contained 59.3% Cl and was insoluble in the usual solvents.

The second chlorination stage is carried out in an acid medium in Example V and in an alkaline medium in Examples VI and VII.

Example V

Into 200 gr. latex of a concentration of 7% which has been stabilized with 2% Emulphor-O and acidified with 140 cub. cms. HCl ($d=1.19$), chlorine was introduced during 14 hours at 50° C. (at the rate of 20 liters per hour). The chlorinated rubber obtained contained 60.0% Cl and was insoluble in the usual solvents. This chlorinated rubber was ground to a dispersion with a content of 6% of dry solids and having an acidity of 0.1 normal. Into 150 gr. of this dispersion chlorine was introduced during 3 hours at 80° C. (at the rate of 8 liters per minute). The soluble chlorinated rubber obtained after separation from the dispersion had a chlorine content of 66.8% and a viscosity of 27 cps. at 250 C. (20% solution in toluene).

Example VI

Into 200 gr. latex of a concentration of 50% which has been stabilized with 2% Triton X 100 (poloxyethyleneglycolalkylarylether) and acidified with 100 cub. cms. HCl ($d=1.19$), chlorine was introduced during 6 hours at a temperature of 20° C. (at the rate of 20 liters per hour). The chlorinated rubber here obtained had a chlorine content of 53.3% and was insoluble in the usual solvents. This chlorinated rubber was ground to a dispersion containing 7% of dry solids and after addition of sodium hydroxide had an alkalinity of 1.25 normal. Into 150 gr. of this dispersion chlorine was introduced during 3 hours at 40° C. (at the rate of 5 liters per hour). The soluble chlorinated rubber obtained after separation from the dispersion had a chlorine content of 64.2% and a viscosity of 6 cps. at 25° C. (20% solution in toluene).

Example VII

Into 200 gr. latex of a concentration of 60% which has been stabilized with 2% Emulphor-O and acidified with 140 cub. cms. HCl ($d=1.19$) chlorine was introduced during 9 hours at a temperature of 10° C. (at the rate of 20 liters per hour). The chlorinated rubber thus obtained was separated and was found to contain 55.0% chlorine and to be insoluble in the usual solvents. It was ground to a dispersion containing 7% of dry solids and after addition of sodium hydroxide had an alkalinity of 0.8 normal. Into 150 gr. of this dispersion chlorine was introduced during 3 hours at a temperature of 70° C. (at the rate of 8 liters per hour). The soluble chlorinated rubber obtained after separation from the dispersion was found to have a chlorine content of 64.5% and a viscosity of 3 cps. at 25° C. (20% solution in toluene).

Various changes may be made in the steps, substances and conditions of working disclosed in the foregoing specification without departing from the invention or sacrificing the advantages thereof.

I claim:

1. The two-stage process of preparing aqueous dispersions of chlorinated rubber soluble in conventional solvents, which comprises introducing at a temperature below about 50° C. into latex stabilized against acid and having an acidity of at least 2 normal, chlorine gas, until the chlorinated rubber in the dispersion which has formed, contains at least 50% chlorine, diluting the dispersion with water to a dry solid contents of not more than 30% and then continuing the introduction of chlorine gas at a temperature within the range of 0° and 90° C. until the chlorinated rubber contains chlorine within the range of 63% and 68%.

2. The process according to claim 1, in which the acidification is obtained by the addition of hydrochloric acid.

3. The process according to claim 1, in which the acidity at the beginning of the second chlorination stage ranges between 0 and 8 normal.

4. The two-stage process of preparing aqueous dispersions of chlorinated rubber soluble in conventional solvents, which comprises introducing at a temperature below about 50° C. into latex stabilized against acid and having an acidity of at least 2 normal, chlorine gas, until the chlorinated rubber in the dispersion which has formed, contains at least 50% chlorine, diluting the dispersion with water to a dry solid contents of not more than 30% and then continuing the introduction of chlorine gas in an acid medium at a temperature ranging between 60° and 90° C. until the chlorinated rubber contains chlorine within the range of 63% and 68%.

5. The two-stage process of preparing aqueous dispersions of chlorinated rubber soluble in conventional solvents, which comprises introducing at a temperature below about 50° C. into latex stabilized against acid and having an acidity of at least 2 normal, chlorine gas, until the chlorinated rubber in the dispersion which has formed, contains at least 50% chlorine, diluting the dispersion with water to a dry solid contents of not more than 30%, adding alkali and then continuing the introduction of chlorine gas at a temperature ranging between 0° and 90° C. until the chlorinated rubber contains chlorine within the range of 63% and 68%.

6. The process according to claim 5, in which the alkalinity at the beginning of the second chlorination stage ranges between 0 and 6 normal.

7. The process according to claim 5, in which the soluble chlorinated rubber is precipitated in the aqueous dispersion and separated from the water.

References Cited in the file of this patent

UNITED STATES PATENTS

| | | |
|---|---|---|
| 2,586,124 | Van Amerongen | Feb. 19, 1952 |
| 2,663,747 | Ten Have | Dec. 22, 1953 |

FOREIGN PATENTS

| | | |
|---|---|---|
| 634,241 | Great Britain | Mar. 15, 1950 |